US012646708B2

(12) United States Patent
Kim et al.

(10) Patent No.: US 12,646,708 B2
(45) Date of Patent: Jun. 2, 2026

(54) MULTILAYERED ANODE ACTIVE MATERIAL, METHOD OF PREPARING THE SAME, AND LITHIUM SECONDARY BATTERY INCLUDING THE SAME

(71) Applicant: GRAPSIL CO., LTD., Chungcheongnam-do (KR)

(72) Inventors: Huijin Kim, Chungcheongnam-do (KR); Hyunki Park, Seoul (KR)

(73) Assignee: GRAPSIL CO., LTD., Chungcheongnam-do (KR)

( * ) Notice: Subject to any disclaimer, the term of this patent is extended or adjusted under 35 U.S.C. 154(b) by 511 days.

(21) Appl. No.: 18/263,843

(22) PCT Filed: Jul. 26, 2022

(86) PCT No.: PCT/KR2022/010927
§ 371 (c)(1),
(2) Date: Aug. 1, 2023

(87) PCT Pub. No.: WO2023/008866
PCT Pub. Date: Feb. 2, 2023

(65) Prior Publication Data
US 2024/0105919 A1 Mar. 28, 2024

(30) Foreign Application Priority Data
Jul. 28, 2021 (KR) ........................ 10-2021-0098987

(51) Int. Cl.
*H01M 4/36* (2006.01)
*H01M 4/02* (2006.01)
(Continued)

(52) U.S. Cl.
CPC ......... *H01M 4/366* (2013.01); *H01M 4/0419* (2013.01); *H01M 4/386* (2013.01);
(Continued)

(58) Field of Classification Search
CPC .... H01M 4/366; H01M 4/0419; H01M 4/386; H01M 4/583; H01M 10/052; H01M 2004/027
See application file for complete search history.

(56) References Cited

U.S. PATENT DOCUMENTS

2018/0040886 A1* 2/2018 Yokoi ..................... H01M 4/36
2018/0145316 A1* 5/2018 Moon ................... H01M 4/134
(Continued)

FOREIGN PATENT DOCUMENTS

CN 108075117 A * 5/2018 .......... H01M 10/052
JP 2004-259475 A 9/2004
(Continued)

OTHER PUBLICATIONS

Hsu, "Synthesis of double core-shell carbon/silicon/graphite composite anode materials for lithium-ion batteries", Surface & Coatings Technology 387 (2020) 125528 (Year: 2020).*
(Continued)

*Primary Examiner* — Matthew J Merkling
(74) *Attorney, Agent, or Firm* — Mendelsohn Dunleavy, P.C.

(57) ABSTRACT

Disclosed are an anode active material having a multilayered structure including a core including a carbon material, a first shell surrounding the core and including silicon particles, and a second shell surrounding the first shell and including a first crystalline carbon layer, a first amorphous carbon layer, a second crystalline carbon layer, and a second amorphous carbon layer, a method of preparing the same, and a lithium secondary battery including the same.

15 Claims, 2 Drawing Sheets

(51) Int. Cl.

| | | |
|---|---|---|
| *H01M 4/04* | (2006.01) | |
| *H01M 4/38* | (2006.01) | |
| *H01M 4/583* | (2010.01) | |
| *H01M 10/052* | (2010.01) | |

(52) U.S. Cl.

CPC ......... *H01M 4/583* (2013.01); *H01M 10/052* (2013.01); *H01M 2004/027* (2013.01)

(56) References Cited

U.S. PATENT DOCUMENTS

| | | | | |
|---|---|---|---|---|
| 2020/0083536 A1* | 3/2020 | Lee | ....................... | H01M 4/587 |
| 2021/0135193 A1* | 5/2021 | Wang | .................... | H01M 4/625 |
| 2022/0115703 A1* | 4/2022 | Miyachi | .............. | H01M 4/0404 |
| 2022/0231282 A1* | 7/2022 | Nakayama | .............. | H01M 4/62 |
| 2022/0246918 A1* | 8/2022 | Matsuhara | .......... | H01M 4/1393 |
| 2023/0327125 A1* | 10/2023 | Han | ...................... | H01M 4/364 |
| | | | | 429/231.8 |

FOREIGN PATENT DOCUMENTS

| | | | | | |
|---|---|---|---|---|---|
| JP | 2004-296161 | A | 10/2004 | | |
| KR | 10-2001-0096073 | A | 11/2001 | | |
| KR | 10-2006-0069738 | A | 6/2006 | | |
| KR | 20170047095 | A | * | 5/2017 | ........ H01M 10/0525 |
| KR | 10-2018-0094747 | A | 8/2018 | | |
| KR | 10-2376217 | B1 | 3/2022 | | |

OTHER PUBLICATIONS

Machine Translation of CN-108075117-A (Feb. 16, 2026) (Year: 2026).*

Machine Translation of KR-20170047095-A (Feb. 16, 2026) (Year: 2026).*

International Search Report and Written Opinion for corresponding International application No. PCT/KR2022/010927; dated Nov. 1, 2022 (14 pages) Machine Translation.

* cited by examiner

MULTILAYERED ANODE ACTIVE MATERIAL, METHOD OF PREPARING THE SAME, AND LITHIUM SECONDARY BATTERY INCLUDING THE SAME

TECHNICAL FIELD

The present invention relates to a high-capacity anode active material having excellent conductivity based on a multilayer structure thereof, a method of preparing the same, and a lithium secondary battery with excellent long term stability, output characteristics, and safety including the same.

BACKGROUND ART

Lithium secondary batteries are widely used as power sources for mobile electronic devices including mobile phones and application fields thereof are expanding in response to increasing demand for large devices such as electric vehicles.

Meanwhile, most currently commercialized lithium secondary batteries use a carbon-based material as an anode active material. In particular, graphite has advantages of exhibiting excellent long term stability due to very reversible charge and discharge behaviors based on the uniaxial orientation of the graphene layer, and of exerting high energy when used for lithium oxide-based cathodes and batteries due to the voltage (potential) thereof being similar to that of lithium metal. However, despite these advantages, graphite has a limitation of lower theoretical capacity (372 mAh/g) than expected of modern high-capacity batteries.

Accordingly, attempts have been made to use metal materials such as Si, Sn, and Al that exhibit higher capacities as materials that can replace carbon-based anode active materials. However, these metal materials cause great volume expansion and contraction during lithium intercalation and deintercalation, disadvantageously resulting in undifferentiation, loss of conduction path, and the like, and thus deterioration in overall battery performance.

In order to solve this disadvantage, efforts are made to simply mix various carbon materials with Si, chemically fix fine powder Si on the carbon surface using a silane coupling agent, or fix amorphous carbon on the Si surface through CVD.

However, carbon in the carbon material simply mixed with Si may be released from Si as Si undergoes large volume expansion and contraction during charge and discharge. For this reason, disadvantageously, long term stability is greatly deteriorated due to deteriorated electrical conductivity.

In addition, the material prepared by chemically fixing fine powder Si on the carbon surface using a silane coupling agent, CVD, or the like does not maintain the binding using a silane coupling agent or CVD for a long time, thus disadvantageously resulting in deterioration in long term stability as charge/discharge cycles proceed and making it difficult to obtain an anode material with stable quality through uniform physical and chemical bonding.

Despite these various attempts, the problem of damage to the electrode due to expansion of Si during discharge still remains.

Therefore, there is an increasing need for a high-capacity anode active material with excellent conductivity and a lithium secondary battery with excellent long term stability and output characteristics and high safety including the same.

DISCLOSURE

Technical Problem

The present invention has made to overcome the drawbacks and disadvantages of the prior art and technical problems that have yet to be resolved in the art.

Specifically, it is one object of the present invention to provide a high-capacity, multilayered anode active material that is capable of suppressing volume expansion during charge and discharge of batteries while exhibiting excellent conductivity.

It is another object of the present invention to provide a method for preparing the anode active material.

It is another object of the present invention to provide a lithium secondary battery having excellent long term stability and output characteristics and safety including the anode active material.

Technical Solution

In accordance with one aspect of the present invention, the above and other objects can be accomplished by the provision of an anode active material having a multilayered structure including a core including a carbon material, a first shell surrounding the core and including silicon particles, and a second shell surrounding the first shell and including a first crystalline carbon layer, a first amorphous carbon layer, a second crystalline carbon layer, and a second amorphous carbon layer.

The core may have a particle diameter of 1 to 30 μm.

The first crystalline carbon layer may include natural graphite having a width of 1 to 10 μm and a thickness of 10 nm to 2 μm.

The second crystalline carbon layer may include carbon fibers.

The second shell may have a thickness of 1 to 200 μm.

The anode active material may have an average particle diameter (D50) of 1 to 500 μm.

In accordance with another aspect of the present invention, provided is a method for producing an anode active material having a multilayer structure, the method including:

(A) preparing a core using a carbon material;

(B) injecting the carbon material into a silicon slurry including silicon particles and a dispersion medium, followed by spray-drying to form a first shell on the core; and (C) forming a second shell surrounding the first shell, the step (C) including:

(C-a) applying first crystalline carbon to the first shell, and mixing the resulting first shell with a precursor of first amorphous carbon, followed by firing to prepare a mixture; and (C-b) coating the mixture with second crystalline carbon and then mixing the resulting mixture with a precursor of second amorphous carbon, followed by firing.

A weight ratio of the carbon material to the silicon particles in step (B) may be 10:90 to 60:40.

The spray drying may be performed at 80 to 300° C.

The step (C-a) may include mixing the powder prepared by spray drying in step (B) with the first crystalline carbon in a weight ratio of 80:20 to 99:1 and mixing the resulting mixture with a precursor of first amorphous carbon in a weight ratio of 40:60 to 99:1, followed by firing to prepare a mixture.

The first crystalline carbon may include natural graphite having a width of 1 to 10 μm and a thickness of 10 nm to 2 μm.

The step (C-b) may include mixing the mixture with second crystalline carbon in a weight ratio of 98:2 to 99.9:0.1 and mixing the resulting mixture with a precursor of second amorphous carbon in a weight ratio of 90:10 to 99:1, followed by firing.

The second crystalline carbon may include carbon fibers.

The firing in steps (C-a) and (C-b) may be performed at 850 to 1,100° C.

In accordance with another aspect of the present invention, provided is a lithium secondary battery including the anode active material.

Advantageous Effects

The anode active material according to the present invention is capable of securing high strength because it has a multilayered structure including a core, a first shell, and a second shell, wherein the second shell is formed by alternately doubly disposing highly conductive crystalline carbon and an amorphous carbon layer and thus is capable of exhibiting excellent long term stability. A lithium secondary battery including the same exhibits output characteristics.

In addition, the anode active material according to the present invention is effectively capable of suppressing volume expansion because the multilayer structure acts as a buffer even if silicon particles located in the first shell are repeatedly contracted and expanded during charge and discharge of batteries and of securing the safety of lithium secondary batteries because contact between silicon particles and the electrolyte can be blocked.

BEST MODE

Figure 1:
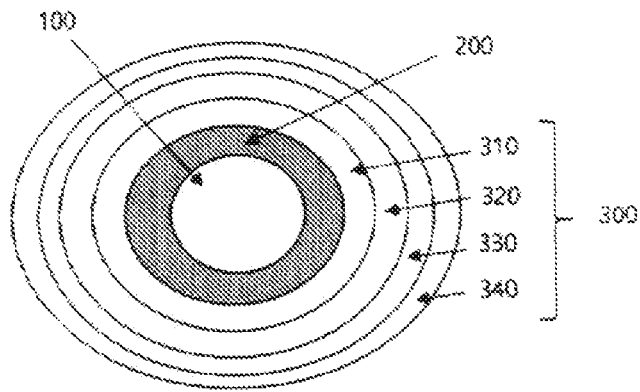
FIG. 1 is a schematic diagram illustrating a cross-section of a multilayered anode active material according to an embodiment of the present invention.

FIG. 1 is a schematic diagram illustrating a cross-section of an anode material having a multilayer structure according to an embodiment of the present invention, but is not limited to this form.

The present invention provides an anode active material having a multilayered structure including a core 100 including a carbon material, a first shell 200 surrounding the core 100 and including silicon particles, and a second shell 300 surrounding the first shell 200 and including a first crystalline carbon layer 310, a first amorphous carbon layer 320, a second crystalline carbon layer 330, and a second amorphous carbon layer 340.

The anode active material according to the present invention is capable of securing high strength because it has a multilayered structure including a core 100, a first shell 200, and a second shell 300, wherein the second shell 300 is formed by alternately doubly disposing highly conductive crystalline carbon and an amorphous carbon layer and thus is capable of exhibiting excellent long term stability. A lithium secondary battery including the same exhibits output characteristics.

In addition, the anode active material according to the present invention is effectively capable of suppressing volume expansion because the multilayer structure acts as a buffer even if silicon particles located in the first shell 200 repeatedly contract and expand during charge and discharge of batteries and of securing the safety of lithium secondary batteries because contact between silicon particles and the electrolyte can be blocked.

The core 100 may include a carbon material.

The carbon material may be crystalline carbon or amorphous carbon, specifically, crystalline carbon with high conductivity, and may, for example, be selected from the group consisting of natural graphite, artificial graphite, expanded graphite, graphene, fullerene soot and combinations thereof and is, specifically, natural graphite having a particle diameter in the range of 4 to 8 μm.

The particle diameter of the core 100 may be 1 to 30 μm. When the diameter does not fall within the range defined above, disadvantageously, proper conductivity cannot be secured or the preparation process is deteriorated.

The first shell 200 may be formed by disposing silicon particles on all or part of the surface of the core 100.

The silicon particles constituting the first shell 200 may have an average particle diameter (D50) of 10 nm to 1,000 nm. Disadvantageously, when the average particle diameter of the silicon particles is excessively small, below the above range, process efficiency is reduced, and when the average particle diameter is excessively great, above the above range, micronization, contact with the electrolyte solution, or the like may occur during charge and discharge. Specifically, the average particle diameter may be 50 nm to 300 nm.

The amount of the silicon particles may be 30 to 60% by weight based on the total weight of the anode active material. Disadvantageously, when the amount of the silicon particles is excessively small, below the above range, the effects intended by the present invention, such as improvement in long term stability, cannot be obtained, and when the amount of the silicon particles is excessively great, above the above range, micronization may be serious during charge and discharge.

The particle diameter of the powder formed by disposing silicon particles on all or part of the surface of the carbon material in the structure of the core-first shell is determined depending on the spray drying conditions and may be, for example, 1 to 800 μm, specifically, 1 to 600 μm.

The second shell 300 is formed by disposing the first crystalline carbon layer 310, the first amorphous carbon layer 320, the second crystalline carbon layer 330, and the second amorphous carbon layer 340, while coating the first shell 200, and has a configuration in which the first crystalline carbon layer 310, the first amorphous carbon layer 320, the second crystalline carbon layer 330, and the second amorphous carbon layer 340 are stacked in this order, thereby securing appropriate strength and high conductivity.

The first crystalline carbon layer 310 may be formed on all or part of the surface of the first shell. The first crystalline carbon layer 310 may include at least one selected from the group consisting of high-conductivity natural graphite, artificial graphite, expanded graphite, graphene, and fullerene soot. Specifically, the first crystalline carbon layer may include natural graphite in the form of a plate having a width of 1 to 10 μm and a thickness of 10 nm to 2 μm, more specifically a width of 3 to 6 μm and a thickness of 10 nm to 1 μm.

The first amorphous carbon layer 320 may be formed on all or part of the surface of the first crystalline carbon layer 310. The first amorphous carbon layer 320 may include at least one selected from the group consisting of soft carbon, hard carbon, pitch carbide, mesophase pitch carbide, and calcined coke, but is not limited thereto.

The second crystalline carbon layer 330 may be formed on all or part of the surface of the first amorphous carbon layer 320. The second crystalline carbon layer 330 may include carbon fibers. The carbon fibers may, for example, include at least one selected from among carbon fibers, single-walled carbon nanotubes, multiwalled carbon nanotubes, carbon nanowires, and modified forms thereof, but are not limited thereto.

The second amorphous carbon layer 340 may be formed on all or part of the surface of the second crystalline carbon layer 330. The second amorphous carbon layer 340 may be selected from at least one of the group consisting of soft carbon, hard carbon, pitch carbide, mesophase pitch carbide, calcined coke, and combinations thereof, but is not limited thereto.

The second shell 300 may have a thickness of 1 to 200 μm. Within the range defined above, it is possible to minimize volume expansion and increase reversible capacity due to smooth movement of lithium ions.

The average particle diameter (D50) of the anode active material according to the present invention may be 1 to 500 μm, specifically 10 to 300 μm. The average particle diameter of the anode active material is determined depending on the content of the carbon material, silicon particles, crystalline carbon, and amorphous carbon constituting the anode active material, spray drying conditions, pulverization and screening conditions, and the like. Within the above range, it is possible to obtain the optimum effect according to the present invention.

Meanwhile, the present invention provides a method for preparing the anode active material having the multilayer structure.

Specifically, the method includes:

(A) preparing a core using a carbon material;

(B) injecting the carbon material into a silicon slurry containing silicon particles and a dispersion medium, followed by spray-drying to form a first shell on the core; and (C) forming a second shell surrounding the first shell including:

(C-a) applying first crystalline carbon to the first shell and mixing the resulting first shell with a precursor of first amorphous carbon, followed by firing to prepare a mixture; and (C-b) coating the mixture with second crystalline carbon and then mixing the resulting mixture with a precursor of second amorphous carbon, followed by firing.

According to the present invention, it is possible to prepare an anode active material having a multilayer structure including a core, a first shell, and a second shell. The second shell is capable of securing appropriate strength because it is formed by alternately doubly disposing highly conductive crystalline carbon and an amorphous carbon layer and a lithium secondary battery including the same is capable of exhibiting excellent long term stability and output characteristics.

The anode active material prepared according to the present invention can effectively suppress volume expansion due to the multilayer structure acting as a buffer even if the silicon particles located in the first shell repeatedly contract and expand during charge and discharge of batteries. The safety of the lithium secondary battery can be secured because contact between the particles and the electrolyte can be blocked.

In step (a), the core is prepared using a carbon material.

The carbon material may be crystalline carbon or amorphous carbon and may, for example, be selected from at least one of the group consisting of natural graphite, artificial graphite, expanded graphite, graphene, fullerene soot and combinations thereof and is, specifically, natural graphite having a particle diameter in the range of 4 to 8 μm.

In step (B), the carbon material may be added to a silicon slurry containing silicon particles and a dispersion medium, followed by spray drying to form a first shell on the core.

The silicon slurry may be prepared separately by thoroughly dispersing the silicon particles in the dispersion medium before adding the carbon material. In this case, the silicon particles are not exposed to the atmosphere and are used as a slurry. Therefore, oxidation can be suppressed and the capacity of a lithium secondary battery using the same can be further improved.

The silicon particles may have an average particle diameter (D50) of 10 nm to 1,000 nm. Disadvantageously, when the average particle diameter of the silicon particles is excessively small, below the range, process efficiency is reduced, and when the average particle diameter is excessively great, above the range, micronization, contact with the electrolyte solution, or the like may occur during charge and discharge. Specifically, the average particle diameter may be 50 nm to 300 nm.

The dispersion medium may, for example, include one selected from the group consisting of N-methyl-2-pyrrolidone (NMP), tetrahydrofuran (THF), water, ethanol, methanol, cyclohexanol, cyclohexanone, methyl ethyl ketone, acetone, ethylene glycol, octyne, diethyl carbonate, dimethyl sulfoxide (DMSO), and combinations thereof, but is not limited thereto.

The weight ratio of the silicon particles to the dispersion medium may be 1:99 to 30:70. When the weight ratio does not fall within the range defined above, disadvantageously, silicon particles or the like agglomerate into lumps or uniform dispersion of silicon particles in the dispersion medium is difficult. Specifically, the weight ratio of the silicon particles to the dispersion medium may be 5:95 to 20:80.

The weight ratio of the carbon material to the silicon particles may be 10:90 to 60:40. When the content of the carbon material is excessively small, below the range or the content of the silicon particles is below the range, the effect of improving long term stability intended by the present invention cannot be obtained and when the content of the carbon material is excessively small, below the range or the content of the silicon particles is excessively great, above the range, micronization may be serious during discharge or sufficient electrical conductivity cannot be secured.

The spray drying may be performed by a general drying method including rotational spraying, nozzle spraying, ultrasonic spraying, or a combination thereof, and the flow rate of the solution during spraying, spraying pressure, spraying speed, temperature, or the like may be performed in an appropriate manner controlled depending on the average particle diameter of the anode active material. For example, the spray drying may be performed at an inlet temperature or an outlet temperature of 80 to 300° C.

In step (c), the second shell may be formed so as to surround the first shell.

The second shell is capable of ensuring appropriate strength as well as high conductivity because it is formed by disposing a first crystalline carbon layer, a first amorphous carbon layer, a second crystalline carbon layer, and a second amorphous carbon layer, while coating the first shell, and specifically, includes a configuration in which a first crystalline carbon layer 310, a first amorphous carbon layer 320, a second crystalline carbon layer 330, and a second amorphous carbon layer 340 are stacked in this order.

In step (C-a), the first crystalline carbon may be applied to the powder prepared by spray drying in step (B) by mixing the powder with the first crystalline carbon in a weight ratio of 80:20 to 99:1. When the ratio defined above does not fall within the range, disadvantageously, the effect of improving the long term stability and output characteristics intended by the present invention through improvement in conductivity cannot be obtained.

Then, the mixture may be prepared by mixing the applied first crystalline carbon with a precursor of first amorphous carbon in a weight ratio of 40:60 to 99:1, followed by firing. Disadvantageously, when the content of the first amorphous carbon precursor is excessively small, below the range defined above, it is difficult to provide appropriate strength and thus to maintain the shape of the powder, and when the content of the first amorphous carbon precursor is excessively great, above the range defined above, the powder may agglomerate due to the use of an adhesive during the preparation process, resulting in a prolonged pulverization process, conversion of the spherical powder into amorphous powder, and deterioration in the overall characteristics of the battery using the same.

The first crystalline carbon may include at least one selected from the group consisting of high-conductivity natural graphite, artificial graphite, expanded graphite, graphene, fullerene soot and combinations thereof and may include natural graphite in the form of a plate having a width of 1 to 10 μm and a thickness of 10 nm to 2 μm, more specifically, a width of 3 to 6 μm and a thickness of 10 nm to 1 μm.

The first amorphous carbon may be formed on all or part of the surface of the first crystalline carbon. The first amorphous carbon may include at least one selected from the group consisting of soft carbon, hard carbon, pitch carbide, mesophase pitch carbide, calcined coke and combinations thereof, but is not limited thereto.

The firing of step (C-a) may be performed at 850 to 1,150° C. Disadvantageously, when the firing temperature is lower than the lower limit or higher than the upper limit, the amorphous carbon is not sufficiently softened and pores are not sufficiently formed, making it difficult to achieve the intended effects of the present invention.

In step (C-b), the second crystalline carbon may be applied to the mixture by mixing the mixture with the second crystalline carbon in a weight ratio of 98:2 to 99.9:0.1. Disadvantageously, when the ratio does not fall within the range, the effect of improving the long term stability and output characteristics intended by the present invention through the improvement of conductivity cannot be obtained.

Then, the applied second crystalline carbon may be mixed with a precursor of second amorphous carbon in a weight ratio of 90:10 to 99:1, followed by firing. Disadvantageously, when the content of the second amorphous carbon precursor is excessively small, below the above range, it is difficult to properly provide strength and thus to maintain the shape of the powder, and when the content of the second amorphous carbon precursor is excessively great, above the above range, the powder may agglomerate due to the use of an adhesive during the preparation process, resulting in a prolonged pulverization process, conversion of the spherical powder into amorphous powder, and deterioration in the overall characteristics of the battery using the same.

The second crystalline carbon may include carbon fibers. The carbon fibers may, for example, include at least one selected from among carbon fibers, single-walled carbon nanotubes, multiwalled carbon nanotubes, carbon nanowires, and modified forms thereof, but are not limited thereto.

The second amorphous carbon may be formed on all or part of the surface of the second crystalline carbon. The second amorphous carbon may include at least one selected from the group consisting of soft carbon, hard carbon, pitch carbide, mesophase pitch carbide, calcined coke and combinations thereof, but is not limited thereto.

The firing of step (C-b) may be performed at 850 to 1,150° C. Disadvantageously, when the firing temperature is lower than the lower limit or higher than the upper limit, the amorphous carbon is not sufficiently softened and pores are not sufficiently formed, making it difficult to achieve the intended effects of the present invention.

In some cases, after step (C), pulverization and screening may be performed. For example, the pulverization may be performed using a jet mill, a pin mill, or a combination thereof, and then sieving may be performed to prepare the anode active material.

The average particle diameter (D50) of the anode active material may be determined depending on pulverization and screening conditions or the spray drying conditions, and may be, for example, 1 to 500 μm, and specifically 10 to 300 μm.

In addition, the present invention provides a lithium secondary battery including the anode active material.

The lithium secondary battery includes a cathode including a cathode active material, an anode including the anode active material, and an electrolyte solution.

The cathode is formed by applying a cathode mix including the cathode active material to a current collector, and the cathode mix may further include a binder and a conductive material, if necessary.

The cathode active material may be, for example, a lithium metal oxide such as $LiNi_{0.8-x}Co_{0.2}Al_xO_2$, $LiCo_xMn_yO_2$, $LiNi_xCo_yO_2$, $LiNi_xMn_yO_2$, $LiNi_xCo_yMn_zO_2$, $LiCoO_2$, $LiNiO_2$, $LiMnO_2$, $LiFePO_4$, $LiCoPO_4$, $LiMnPO_4$ and $Li_4Ti_5O_{12}$ ($0<x<1$, $0<y<1$), chalcogenides such as $Cu_2Mo_6S_8$, FeS, CoS, and MiS, oxides, sulfides or halides of scandium, ruthenium, titanium, vanadium, molybdenum, chromium, manganese, iron, cobalt, nickel, copper and zinc, and the like. More specifically, the cathode active material may be $LiNi_{0.8}Co_{0.1}Mn_{0.1}O_2$, $TiS_2$, $ZrS_2$, $RuO_2$, $Co_3O_4$, $Mo_6S_8$, or $V_2O_5$, but is not limited thereto.

The shape of the cathode active material is not particularly limited and may be a particle shape, such as a spherical shape, an elliptical shape, or a rectangular parallelepiped shape. The average particle diameter of the cathode active material may be in the range of 1 to 50 μm, but is not limited thereto. The average particle diameter of the cathode active material may be obtained by, for example, measuring the particle diameters of the active material observed with a scanning electron microscope and calculating an average thereof.

The binder is not particularly limited and may be a fluorine-containing binder such as polyvinylidene fluoride (PVDF) or polytetrafluoroethylene (PTFE), but is not limited thereto.

The content of the binder is not particularly limited as long as the cathode active material can be fixed, and may be in the range of 0 to 10% by weight with respect to the total weight of the cathode.

The conductive material is not particularly limited as long as the conductivity of the cathode can be improved and examples thereof include nickel powder, cobalt oxide, titanium oxide, and carbon. Specifically, the carbon may include at least one selected from the group consisting of Ketjen black, acetylene black, furnace black, graphite, carbon fibers, and fullerene.

The content of the conductive material may be determined in consideration of other battery conditions such as the type of conductive material, and may be, for example, in the range of 1 to 10% by weight with respect to the total weight of the cathode.

The thickness of the cathode mix layer obtained by applying the cathode mixture including the cathode active material, the binder, and the conductive material to the current collector may be, for example, 0.1 micrometers to 1,000 micrometers.

If necessary, the cathode mix may include the solid electrolyte according to the present invention in an amount of 0.1% to 60% by weight, specifically 10% to 50% by weight, based on the total weight of the cathode mix.

The thickness of the cathode mix layer may be, for example, 0.1 micrometers to 1,000 micrometers.

There is no particular limit as to the cathode current collector, so long as it has high conductivity without causing adverse chemical changes in the fabricated battery. Examples of the cathode current collector include stainless steel, aluminum, nickel, titanium, sintered carbon, and aluminum or stainless steel surface-treated with carbon, nickel, titanium, silver or the like. In addition, the current collector may be used in various forms including films, sheets, foils, nets, porous structures, foams and non-woven fabrics having fine irregularities on the surface thereof.

The anode is formed by applying an anode mix including the anode active material to an anode current collector. The anode active material may be the anode active material according to the present invention, but may be used in combination with metal oxide, a metal, lithium composite oxide, crystalline carbon, amorphous carbon, or the like. The anode mix may further include a binder and a conductive material having the configuration as described above.

There is no particular limit as to the anode current collector, so long as it has high conductivity without causing adverse chemical changes in the fabricated lithium secondary battery. Examples of the anode current collector include copper, stainless steel, aluminum, nickel, titanium, sintered carbon, copper or stainless steel surface-treated with carbon, nickel, titanium, silver, or the like, aluminum-cadmium alloys and the like. In addition, the anode current collector may be used in any one of various forms selected from films, sheets, foils, nets, porous structures, foams and non-woven fabrics having fine irregularities on the surface thereof.

The electrolyte solution contains an organic solvent and an electrolyte.

Any one may be used as the organic solvent without limitation as long as it is commonly used and examples thereof include propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxyethane, diethoxyethane, vinylene carbonate, sulfolane, gamma-butyrolactone, propylene sulfite, tetrahydrofuran and combinations thereof.

Any commonly used lithium salt may be used without limitation as the lithium salt that may be contained in the electrolyte and examples of the anion may include at least one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

A separator is disposed between an anode and a cathode to form a battery structure, the battery structure is wound or folded and accommodated in a cylindrical battery case or a prismatic battery case, and then an electrolyte is injected to complete a secondary battery. Alternatively, a battery structure having a bi-cell structure is stacked and impregnated with an electrolyte, and the resulting structure is sealed in a pouch to complete a lithium secondary battery.

Hereinafter, the present invention will be described in more detail with reference to the following examples. However, these examples should not to be construed as limiting the scope of the present invention.

Example 1

Natural graphite having a diameter of 4 to 8 μm was prepared. An Si slurry having a viscosity of 20 to 300 cps and a solid content concentration of 11% to 16% was prepared. Natural graphite having a diameter of 4 to 8 μm was injected into the Si slurry to prepare a slurry having a viscosity of 25 to 400 cps and then the slurry was spray-dried using a spray dryer set to an outlet temperature of 80° C. or higher to prepare a powder. In this case, the weight ratio of the natural graphite to the silicon particles is 45:55.

The prepared powder was mixed with plate-shaped natural graphite having a width of 3 to 6 μm and a thickness of 1 μm or less in a weight ratio of 95:5 to prepare a powder coated with plate-shaped natural graphite, and the powder was mixed with pitch in a weight ratio of 95:5, followed by primary firing at 850 to 1,100° C. to prepare a mixture.

Then, the mixture and CNTs having a length of 5 to 50 μm were mixed in a weight ratio of 99.9:0.1 to prepare a mixture coated with CNTs, and then the resulting mixture was mixed with pitch in a weight ratio of 95:5, followed by secondary firing at 850 to 1,100° C. Then, the resulting product was pressed, pulverized and screened to prepare an anode active material.

Comparative Example 1

An anode active material was prepared in the same manner as in Example 1, except that secondary firing was not performed.

Comparative Example 2

An anode active material was prepared in the same manner as in Example 1, except that CNT coating was not performed.

Comparative Example 3

Graphite was prepared as an anode material.

Experimental Example 1

Figure 2A:
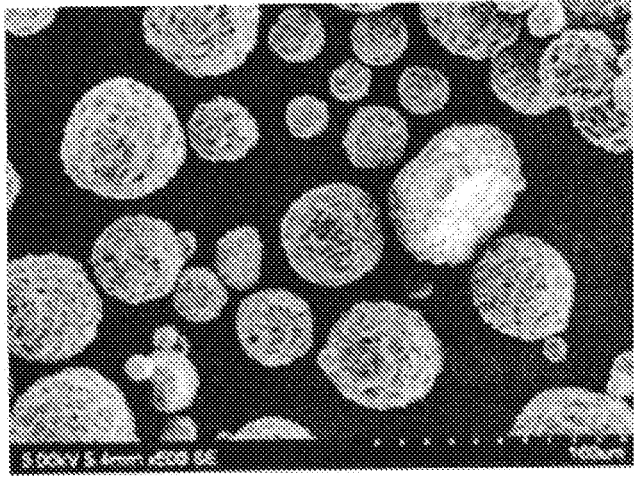
FIG. 2A is an SEM image showing a powder (a) prepared after spray drying and FIG. 2B is an SEM image showing a powder (a) prepared after secondary firing in Example 1.
Figure 2B:
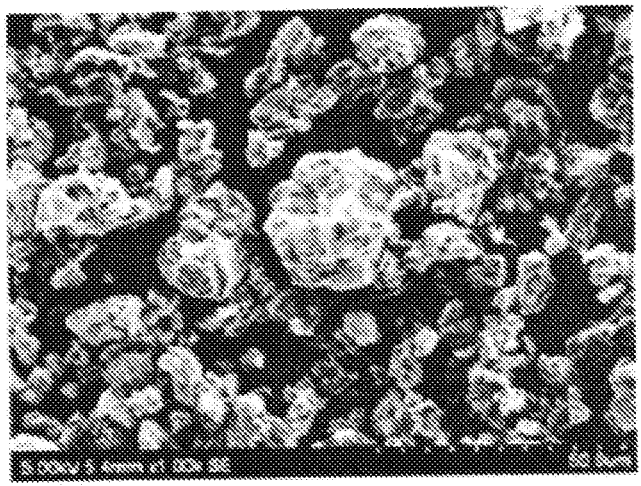

FIG. 2A is an SEM image showing a powder (a) prepared after spray drying and FIG. 2B is an SEM image showing a powder (a) prepared after secondary firing, pressing and pulverization in Example 1.

Experimental Example 2

An anode plate produced using the anode mix prepared by mixing with the anode active material according to Example 1, Comparative Example 1 and Comparative Example 2, graphite, SBR, and CMC in a weight ratio of 13:84:1.5:1.5 was cut into a circular shape of 1.4875 $cm^2$ to produce an anode, and a lithium (Li) metal thin film cut into a circular shape of 1.4875 $cm^2$ was used as a cathode. Here, the anode plate was designed by setting the rolling density to 1.58 g/cc, the current density to 2.8 $mA/cm^2$, and the electrode capacity to 480 mAh/g. A porous polyethylene separator was interposed between the cathode and the anode, and an electrolyte prepared by dissolving 1M $LiPF_6$ in a solution of 0.5 wt % vinylene carbonate in a mixed solution containing methyl ethyl carbonate (EMC) and ethylene carbonate (EC) mixed at a ratio of 7:3 was inserted to produce a lithium coin half-cell. The half-cell was charged at constant current (CC)/constant voltage (CV) of 0.1V/0.1 C to a current cutoff of 0.01 C and was then discharged at 0.2 C CC (constant current) to a cutoff voltage of 1.5V. The discharge rate by controlling a current density based on 0.2 C discharge is shown in Table 1.

TABLE 1

| C-rate | Ex. 1 | Comp. Ex. 1 | Comp. Ex. 2 |
|---|---|---|---|
| 0.2 C (base) | 100% | 100% | 100% |
| 0.5 C | 99.5% | 98.7% | 99.1% |
| 1.0 C | 97.5% | 96.2% | 96.3% |
| 2.0 C | 95.5% | 94.1% | 93.1% |
| 5.0 C | 93.8% | 91.5% | 90.3% |
| 10 C | 87.5% | 85.5% | 83.1% |

As can be seen from Table 1, Example 1 exhibits the smallest discharge rate decrease as a function of a current density.

Experimental Example 3

Half cells were produced using the method in accordance with Experimental Example 2 using the anode active material of Example 1 and the anode active material according to Comparative Example 3 (electrode plate capacity of 345 mAh/g) and the residual capacity was measured as function of the number of cycles at 3 C charge/1 C discharge. The result is shown in FIG. 3.

Figure 3:
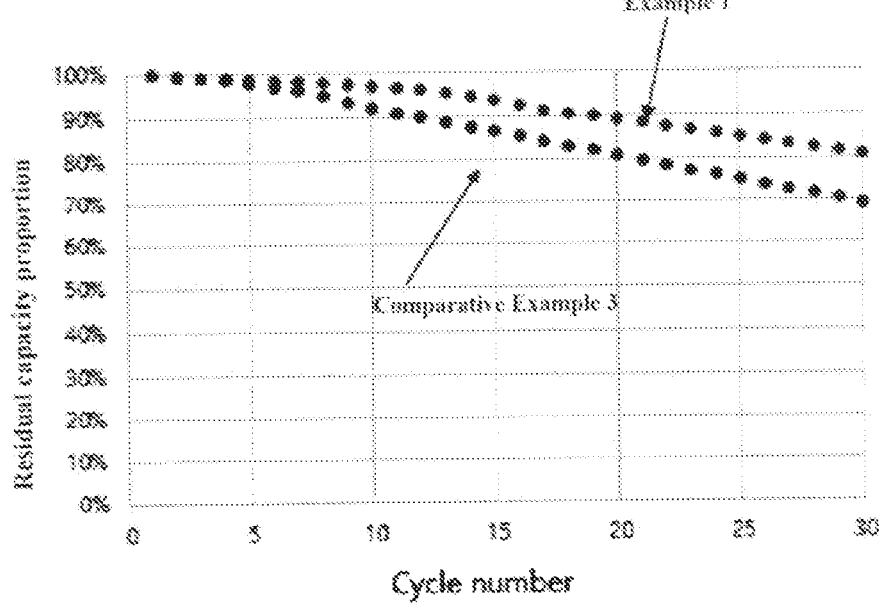
FIG. 3 shows a proportion of residual capacity as a function of the cycle in Experimental Example 2.

As can be seen from FIG. 3, the capacity decrease of Example 1 is smaller than that of Comparative Example 3 as the number of cycles increases.

The invention claimed is:

1. An anode active material having a multilayered structure comprising:

a core comprising a carbon material;

a first shell surrounding the core and comprising silicon particles; and a second shell surrounding the first shell and comprising a first crystalline carbon layer, a first amorphous carbon layer, a second crystalline carbon layer, and a second amorphous carbon layer.

2. The anode active material according to claim 1, wherein the core has a particle diameter of 1 to 30 μm.

3. The anode active material according to claim 1, wherein the first crystalline carbon layer comprises natural graphite having a width of 1 to 10 μm and a thickness of 10 nm to 2 μm.

4. The anode active material according to claim 1, wherein the second crystalline carbon layer comprises carbon fibers.

5. The anode active material according to claim 1, wherein the second shell has a thickness of 1 to 200 μm.

6. The anode active material according to claim 1, wherein the anode active material has an average particle diameter (D50) of 1 to 500 μm.

7. A method for producing an anode active material having a multilayer structure, the method comprising:

(A) preparing a core using a carbon material;

(B) injecting the carbon material into a silicon slurry comprising silicon particles and a dispersion medium, followed by spray-drying to form a first shell on the core; and (C) forming a second shell surrounding the first shell, the step (C) comprising:

(C-a) applying first crystalline carbon to the first shell, and mixing the resulting first shell with a precursor of first amorphous carbon, followed by firing to prepare a mixture; and (C-b) coating the mixture with second crystalline carbon and then mixing the resulting mixture with a precursor of second amorphous carbon, followed by firing.

8. The method according to claim 7, wherein a weight ratio of the carbon material to the silicon particles in step (B) is 10:90 to 60:40.

9. The method according to claim 7, wherein the spray drying is performed at 80 to 300° C.

10. The method according to claim 7, wherein step (C-a) comprises mixing the powder prepared by spray drying in step (B) with the first crystalline carbon in a weight ratio of 80:20 to 99:1 and mixing the resulting mixture with a precursor of first amorphous carbon in a weight ratio of 40:60 to 99:1, followed by firing to prepare a mixture.

11. The method according to claim 7, wherein the first crystalline carbon comprises natural graphite having a width of 1 to 10 μm and a thickness of 10 nm to 2 μm.

12. The method according to claim 7, wherein step (C-b) comprises mixing the mixture with second crystalline carbon in a weight ratio of 98:2 to 99.9:0.1 and mixing the resulting mixture with a precursor of second amorphous carbon in a weight ratio of 90:10 to 99:1, followed by firing.

13. The method according to claim 7, wherein the second crystalline carbon comprises carbon fibers.

14. The method according to claim 7, wherein the firing in steps (C-a) and (C-b) is performed at 850 to 1,100° C.

15. A lithium secondary battery comprising the anode active material according to claim 1.

* * * * *